United States Patent [19]

Mackie et al.

[11] Patent Number: 5,175,913
[45] Date of Patent: Jan. 5, 1993

[54] CONNECTOR FOR USE IN CONNECTING PLANAR OBJECTS

[76] Inventors: Wayne H. Mackie, 107-3950 Linwood,, Burnaby, British Columbia, Canada, V5G-4R5; Christopher L. Finding, 12 Noble Court,, Port Moody, British Columbia, Canada, V3H-3Z5

[21] Appl. No.: 723,272

[22] Filed: Jun. 28, 1991

[51] Int. Cl.$^5$ ............................................. A44B 21/00
[52] U.S. Cl. ....................................... 24/562; 24/341; 24/578; 403/391
[58] Field of Search ................. 24/326, 335, 336, 341, 24/338, 545, 531, 555, 556, 562, 578; 403/361, 383, 391, 397

[56] References Cited

U.S. PATENT DOCUMENTS

| 1,398,852 | 11/1921 | Gilbert . | |
|---|---|---|---|
| 2,042,007 | 5/1934 | Kennedy . | |
| 3,013,654 | 12/1961 | Hoff | 24/326 X |
| 3,747,262 | 7/1973 | Endres . | |
| 3,845,521 | 11/1974 | McNichol . | |
| 3,998,002 | 12/1976 | Nathanson . | |
| 4,521,035 | 6/1985 | Berezowsky . | |
| 4,526,457 | 4/1985 | Mease et al. . | |
| 4,999,885 | 3/1991 | Lee . | |

FOREIGN PATENT DOCUMENTS 1146341 5/1983 Canada .
1174436 9/1984 Canada .

Primary Examiner—James R. Brittain
Attorney, Agent, or Firm—Wenderoth, Lind & Ponack

[57] ABSTRACT

A connector is disclosed which is useful as an element of a toy construction set, or in constructing various structures which can be easily disassembled. The connector includes a mutual connection portion for use in mutually connecting a plurality of connectors and which includes a female connecting portion formed by a recess with an octagonal inner cross section and a male connecting portions formed by a projection with an octagonal outer cross section. A clip member is preferably unitarily formed with the mutual connection portion and extends away therefrom for gripping a planar object and securing the planar object relative to the mutual connection portion. The clip member includes a pair of substantially parallel horizontally elongated legs fixed to the mutual connection portion and extending therefrom. The elongated legs are resilient and closely adjacent one another, such that they are adapted to grip the planar object by way of a biasing force. The biasing force can be enhanced by the provision of serrations on the inner faces of the legs of the clip member.

19 Claims, 2 Drawing Sheets

CONNECTOR FOR USE IN CONNECTING PLANAR OBJECTS

BACKGROUND OF THE INVENTION

1. Field of the Invention

In general, a connector is disclosed for use in connecting planar objects. More specifically, the connector of the present invention is adapted to be connectable in series with other identical connectors and also to engage with a planar object, such as a piece of cardboard.

2. Description of the Prior Art

Various connectors have been proposed in the prior art for connecting planar objects such as panels, photographs and films. For example, in Canadian patent 1 146 341 issued to McDowall, a connector or clamp is disclosed which is adapted for clamping display panels. This connector includes a sleeve member having a hexagonal hole formed therethrough for receipt of a hexagonal hinge pin, and a pair of jaw members adjustably connected to and extending away from the sleeve member. An adjustment bolt extends through and between the two jaw members so as to provide a means to adjust the relative positions of the jaw members in order to clamp or unclamp a display panel therebetween. However, to use this connector in conjunction with other similar connectors or to use it for attaching a display panel to a structure, it is necessary to provide a hexagonal hinge pin to extend through the hexagonal bore in the sleeve member. Furthermore, when the connector is received on such a hexagonal hinge pin, there is nothing to prevent the connector from sliding longitudinally along the hinge pin. Also, the hexagonal shape of the hole and hinge pin, while it may prevent rotation of the clamp, requires the clamps to be positioned at 0°, 60°, or 120° relative to one another, such angles not being the most useful, especially when assembling structures. In addition, the connector is relatively complex in its construction, in that it is formed of numerous discrete elements, such that it would not be suitable for use as a toy, for example, as an element of a children's construction set or the like.

In U.S. Pat. No. 3,998,002 issued to Nathanson, a clamping device is disclosed which is adapted for use as a component in a children's construction set or for use in erecting actual walls or partitions of a building. The clamping device includes a cylindrical portion with a cylindrical bore therethrough through which cylindrical pegs can be extended, and a clip portion for gripping panel members. However, as with the McDowall connector, the Nathanson clamping device must be used in connection with a shaft member extending through a cylindrical bore in order that various individual clamping devices can be connected to one another. In addition, because the bore is cylindrical, the clamping device is free to rotate about the cylindrical pegs and will thus not provide a stable structural connection.

U.S. Pat. No. 4,526,457 to Mease et al. discloses a hanger unit for hanging dental films. This hanger unit includes a connecting projection and a connecting recess by which a plurality of such hanger units can be pivotably connected to one another, and a clip for holding a dental film. However, this hanger unit is specifically adapted for use with dental films and, as such, necessarily utilizes the recess and projection thereof as a pivot joint with other hanger units, such that individual dental films held by the clips can be rotated out of a pack of aligned dental films for viewing purposes. Accordingly, the Mease et al. hanger unit is inapplicable for use as a structural connector.

U.S. Pat. No. 4,521,035 to Berezowsky discloses a paper sheet holder clip which is adapted to hold a plurality of paper sheets in stacked relation to one another, but not in aligned to relation to one another. A building toy clip is disclosed in U.S. Pat. No. 1,398,852 to Gilbert, and is disclosed for use in assembling various panels together. However, the Gilbert toy clip is not useful for mutually connecting numerous of such clips together.

SUMMARY OF THE INVENTION

Accordingly, it is an object of the present invention to provide a connector for use in connecting planar panels which overcomes the above-mentioned disadvantages inherent in the prior art connectors.

More specifically, an object of the present invention is to provide a connector which is of a simple design and which can be readily utilized by children.

A further object is to provide a connector which is adapted to be easily connected with other identical connectors and, at the same time, with planar objects, such as cardboard pieces or the like.

A still further object of the invention is to provide such a connector which can be connected to other identical connectors in such a manner as to be locked into one of a plurality of possible positions relative to the other connectors.

These objects are obtained by the present invention by the provision of a connector comprising a mutual connection portion for use in mutually connecting a plurality of connectors, and a clip means for gripping a planar object and securing the planar object relative to the mutual connection portion. The mutual connection portion comprises a female connecting means, formed by a recess in the upper end of the mutual connecting portion, for receiving a complementary male connecting element, and a male connecting means formed by a projection at the lower end of the mutual connection portion, for engaging in a complementary female connecting element. The recess has an octagonal inner cross section and the projection has an octagonal outer cross section, such that two connectors can be mutually connected in any of eight different positions. The clip means comprises a pair of substantially parallel horizontally elongated legs fixed to and extending from the mutual connection portion.

Preferably, the connector is formed such that the mutual connection portion is unitary, and such that the recess and projection are aligned relative to one another. Furthermore, the recess is to be formed with an inside diameter slightly larger than the outside diameter of the projection, such that a plurality of such connectors can be connected to one another by inserting the projection of one into the recess of another. With respect to the clip means of the connector, it is preferred that each of the legs thereof comprises a substantially planar member fixed vertically along a major portion of the mutual connection portion, and that mutually adjacent vertical faces of the legs are provided with serrations so as to aid in gripping of oblong panels therebetween. Furthermore, it is preferred that the legs of the clip means are closely adjacent one another, and that each of the legs are resilient such that when a planar object is disposed between the legs, a resilient force of each of the legs presses against the planar object and causes the planar object to be gripped between the legs.

BRIEF DESCRIPTION OF THE DRAWINGS

The present invention will now be more fully described in connection with an appended drawing figures, in which.

DETAILED DESCRIPTION OF THE INVENTION

Figure 1:
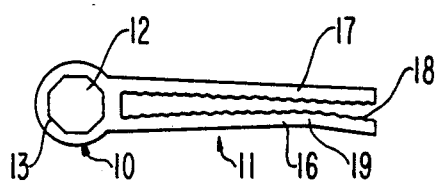
FIG. 1 is a plan view of a connector in accordance with the present invention.
Figure 2:
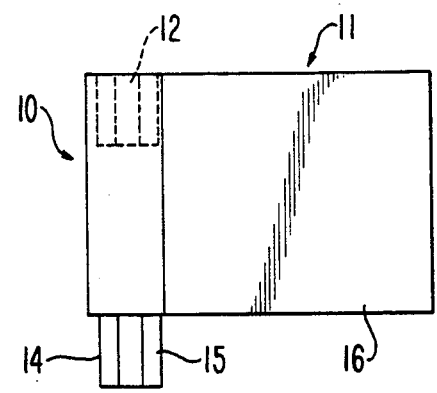
FIG. 2 is a side view of the connector shown in FIG. 1.
Figure 3:
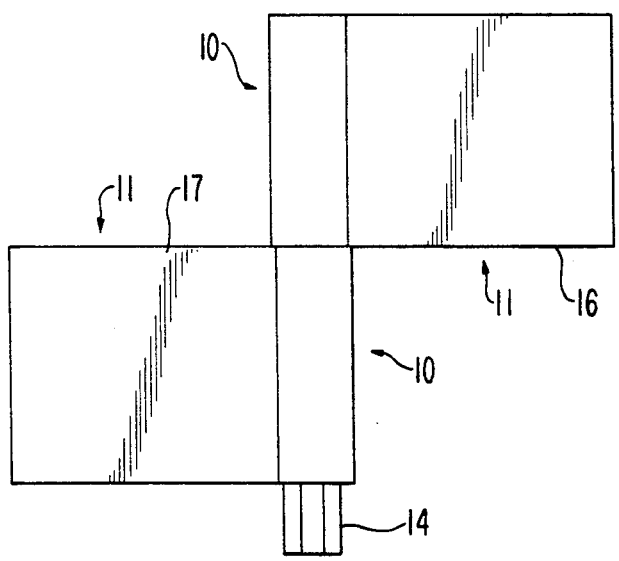
FIG. 3 is a side view of a pair of connectors according to the invention to one another.
Figure 4:
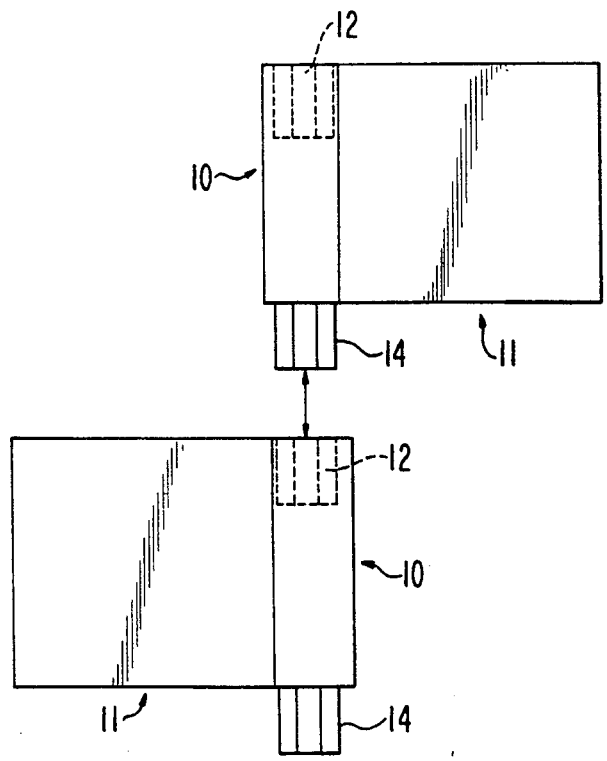
FIG. 4 is a side view of a pair of connectors according to the invention separated from one another to indicate the manner in which they can be connected.
Figure 5:
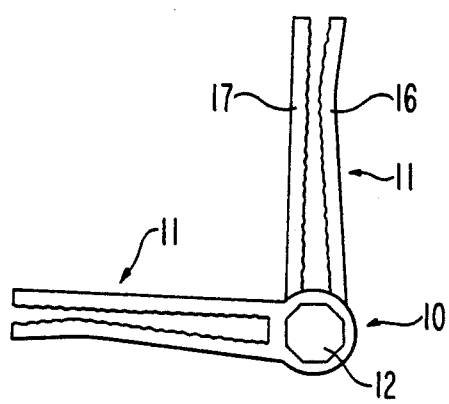
FIG. 5 is a plan view of a pair of connectors according to the invention connected such that clip portions thereof are offset from one another by 90°.
Figure 6:
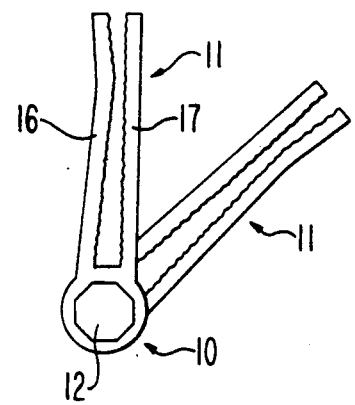
FIG. 6 is a view similar to FIG. 5, except that the clip portions are offset from one another by 45°.
Figure 7:
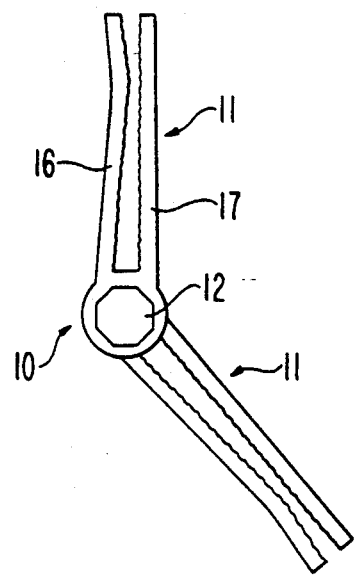
FIG. 7 is a view similar to FIGS. 5 and 6, except with the clip portions are offset from one another by 135°.

As shown in FIGS. 1 and 2, a connector according to the present invention for use in connecting planar objects includes a mutual connection portion 10 for use in mutually connecting a plurality of identical connectors, and a clip means 11 for gripping a planar object, such as a section of cardboard or the like. FIG. 4 illustrates the manner in which connectors according to the present invention can be connected to one another and separated from one another. FIG. 3 shows two such connectors connected together such that their clip means 11 are offset from one another by 180°.

The mutual connection portion 10 of the connector is, as shown in FIGS. 1 and 5-7, preferably substantially cylindrical, but can, of course, be formed in any suitable shape, such as shapes having square and octagonal cross sections or the like. As shown especially in FIGS. 2 and 4, the mutual connection portion of the connector has a female connecting means comprising a recess 12 formed in an upper end thereof, and a male connecting means comprising projection 14 formed at a lower end thereof. The recess 12 and projection 14 of the mutual connection portion 10 are preferably shaped complementary to one another, such that a plurality of the connectors can be connected to one another in the manner shown in FIG. 4. Thus, at least in the preferred embodiment, the recess 12 should be formed with an inside dimension which is slightly larger than the outside dimension of the projection 14, so as to allow the projection 14 of one connector to be inserted into the recess 12 of another connector.

Although it is preferred that the shapes of the recess 12 and projection 14 of a single connector are complementary to one another, it is possible that the recess 12 and projection 14 can be formed with non-complementary shapes. In this situation, it would be necessary to provide connectors with at least two classes of shapes for the recesses 12 and projections 14, such that only certain classes of connectors will fit with other classes of connectors. Although the recess 12 and projection 14 of the connector can be formed with any suitable shapes and/or sizes, respectively, it is preferred that they be formed with shapes having cross sections which are non-circular, such that when two or more connectors are connected to one another, they will not rotate relative to one another. Furthermore, although the non-circular cross sectional shape of the recess 12 and projection 14 can be elliptical, square, hexagonal, or otherwise, it is preferred that they be formed with shapes having octagonal cross sections, as shown in FIGS. 1 and 5-7, such that the projection 14 has eight outer faces 15 and the recess 12 has eight inner faces 13. Recesses and projections having octagonal cross sections provide not only the advantage of locking two mutually attached connectors against rotation relative to one another, but also the advantage that they can be locked in relative positions in which the clip means 11 thereof are offset from one another by 0°, 45°, 90°, 135°, or 180°, these angles being the most useful and most commonly used in forming various structures. Because of the finite depth of the recess 12 and length of the projection 14, when two or more connectors according to the invention are connected to one another, they will not tend to slide longitudinally relative to one another. They can, however, be pulled longitudinally away from one another in order to separate the connectors, but it is to be noted that, in the preferred embodiment, the projection 14 of one connector will fit snugly into the recess 12 of a second connector so that they will not separate when such is not desired.

The clip means 11 of the connector according to the present invention includes a pair of substantially parallel horizontally elongated legs 16, 17 fixed to and extending away from the mutual connection portion 10. As shown in FIGS. 2-4, the legs 16, 17 are vertically elongated as well as horizontally elongated, such that they each form a substantially plate-shaped element, according to the preferred embodiment of the invention. However, it is clear that the relative dimensions of the legs 16, 17 of the clip means 11 can be varied, for example, by reducing the vertical dimensions of the legs or the horizontal dimensions thereof. Furthermore, it is contemplated that the legs 16, 17 can be bifurcated such that each leg includes two or more portions extending from the mutual connection portion 10, or the legs can include other variations such as being varied in shape, or having holes or slots formed therein, in order to fit the various needs of specific situations.

Although it is possible that the legs 16, 17 of the clip means 11 can be fixed to the mutual connection portion 10 in various ways, such as bonding or with other suitable fasteners, in the preferred embodiment, the legs 16, 17 are formed unitarily with the clip means. In addition, although the legs 16, 17 can be biased toward one another by way of a spring or the like, it is preferred that the legs 16, 17 themselves be resilient, such that no additional elements are necessary and the structure of the connector according to the invention remains quite simple. Accordingly, in the preferred embodiment, the gripping force for gripping planar objects such as sections of cardboard or the like between the two legs 16, 17 of the clip means 11 is provided by the legs 16, 17 being closely adjacent one another and being inherently resilient, such that when a planar object is disposed between the legs, a resilient force of each of the legs presses against the planar object and causes the planar object to be gripped between the legs 16, 17. As illustrated in FIGS. 1 and 5-7, this gripping force can be enhanced by providing serrations 18 on the mutually facing surfaces of the legs 16, 17. In addition, one 16 or both of the legs 16, 17 can be slightly bent to form a curved portion 19 to further enhance the gripping force.

Although the mutual connection portion 10 and clip means 11 of the connector can be formed of various materials, such as spring steel or other suitable materials, in the preferred embodiment, the clip means 11 and mutual connection portion 10 are formed of a resin material such as a hard plastic or the like. Use of such hard plastic material lends itself best to connectors according to the invention which are to be used as elements in children's construction sets or other children's toys.

Although the connector according to the present invention is primarily envisioned as a part of a toy construction set to be used by children for constructing play houses or the like from squares of cardboard, it is clear that the connector can be used for many different purposes. For example, the connectors can be used along with cardboard squares or other planar objects by adults to construct mazes or other fascinating structures for children to explore or otherwise play in or with during group functions such as picnics and birthday parties. The connector of the present invention can also be used for more functional purposes, such as constructing structures which can be easily disassembled. For example, the clips can be used to assemble structures such as temporary storage boxes, desk trays, garbage containers, filing cabinets, shelves, storage racks, temporary fencing, flower baskets, temporary pet shelters, clothes hampers, magazine racks, desk organizers, note paper holders, commercial display bins, and commercial window displays of various types.

Although the foregoing description has set forth preferred structural features and functions of the present invention, it is clear that the connector according to the present invention can be modified in various ways and that the embodiments set forth herein are merely exemplary. Accordingly, the scope of the present invention is not to be limited by the foregoing descriptions or by the attached drawing figures, but is to be defined by the appended claims.

What is claimed is:

1. A connector for use in connecting planar objects, comprising:
   a mutual connection portion for use in mutually connecting a plurality of connectors, said mutual connection portion having an upper end and a lower end and comprising at least one of a female connecting means, formed by a recess with an octagonal inner cross section in said upper end of said mutual connection portion, for receiving a complementary male connecting element, and a male connecting means, formed by a projection with an octagonal outer cross section at said lower end of said mutual connection portion, for engaging in a complementary female connecting element; and
   a clip means for gripping a planar object and securing the planar object relative to said mutual connection portion, said clip means comprising a pair of substantially parallel horizontally elongated legs fixed to said mutual connection portion and extending therefrom.

2. A connector as recited in claim 1, wherein said mutual connection portion is unitarily formed with said clip means.

3. A connector as recited in claim 1, wherein said mutual connection portion comprises both of said female connecting means and said male connecting means.

4. A connector as recited in claim 3, wherein
said recess of said female connecting means has eight planar inner faces;
said projection of said male connecting means has eight planar outer faces; and
said eight faces of said projection are substantially aligned with said eight faces of said recess.

5. A connector as recited in claim 4, wherein
a maximum cross-sectional dimension of said recess is slightly greater than a maximum cross-sectional dimension of said projection.

6. A connector as recited in claim 1, wherein
a maximum cross-sectional dimension of said recess is slightly greater than a maximum cross-sectional dimension of said projection.

7. A connector as recited in claim 1, wherein said mutual connection portion is substantially cylindrical.

8. A connector as recited in claim 1, wherein each of said legs comprises a substantially planar member.

9. A connector as recited in claim 1, wherein
said mutual connection portion is vertically elongated; and
each of said legs comprises a substantially planar member fixed vertically along a major portion of said mutual connection portion.

10. A connector as recited in claim 1, wherein mutually adjacent vertical faces of said legs are provided with serrations.

11. A connector as recited in claim 1, wherein said legs are closely adjacent one another, and each of said legs is resilient such that when a planar object is disposed between said legs, a resilient force of each of said legs presses against the planar object and causes the planar object to be gripped between said legs.

12. A connector for use in connecting planar objects, comprising:
   a mutual connection portion for use in mutually connecting a plurality of connectors, said mutual connection portion having an upper end and a lower end and comprising a female connecting means, formed by a recess in said upper end of said mutual connection portion, for receiving a complementary male connecting element, and a male connecting means, formed by a projection at said lower end of said mutual connection portion, for engaging in a complementary female connecting element, said recess having a non-circular inner cross section and said projection having a on-circular outer cross section;
   a clip means for gripping a planar object and securing the planar object relative to said mutual connection portion, said clip means comprising a pair of substantially parallel horizontally elongated legs fixed to said mutual connection portion and extending therefrom in such a manner as to form an insertion opening therebetween which opens upwardly, downwardly, and toward ends of said legs opposite ends thereof fixed to said mutual connection portion; and
   wherein said male connecting means and said female connecting means are operable for connecting the plurality of connectors such that the insertion opening of said clip means of each of the plurality of connectors is aligned along a vertical direction with the insertion opening of said clip means of each of the other of the plurality of connectors.

13. A connector as recited in claim 12, wherein said mutual connection portion is unitarily formed with said clip means.

14. A connector as recited in claim 12, wherein a maximum cross-sectional dimension of said recess is slightly greater than a maximum cross-sectional dimension of said projection.

15. A connector as recited in claim 12, wherein said mutual connection portion is substantially cylindrical.

16. A connector as recited in claim 12, wherein each of said legs comprises a substantially planar member.

17. A connector as recited in claim 12, wherein said mutual connection portion is vertically elongated between said recess and said projection; and each of said legs comprises a substantially planar member fixed vertically along a major portion of said mutual connection portion, such that the insertion opening extends parallel to said mutual connection portion.

18. A connector as recited in claim 12, wherein mutually adjacent vertical faces of said legs are provided with serrations.

19. A connector as recited in claim 12, wherein said legs are closely adjacent one another, and each of said legs is resilient such that when a planar object is disposed between said legs, a resilient force of each of said legs presses against the planar object and causes the planar object to be gripped between said legs.

* * * * *

UNITED STATES PATENT AND TRADEMARK OFFICE
CERTIFICATE OF CORRECTION

PATENT NO. : 5,175,913

DATED : January 5, 1993

INVENTOR(S) : Wayne Mackie et al.

It is certified that error appears in the above-identified patent and that said Letters Patent is hereby corrected as shown below:

Column 3, line 6, "an" should read --the--;

Column 3, line 13, --connected-- should be inserted after "invention"; and

Column 6, line 54, "on-circular" should read --non-circular--.

Signed and Sealed this

Fourteenth Day of December, 1993

Attest:

BRUCE LEHMAN

Attesting Officer     Commissioner of Patents and Trademarks